United States Patent Office 3,546,263
Patented Dec. 8, 1970

3,546,263
PROCESS OF PRODUCING LEAD-, CADMIUM-
AND DIVALENT TIN SALTS OF CARBOX-
YLIC ACIDS
Erich Ruf, Essen, Germany, assignor to Th. Goldschmidt
A.G., Essen, Germany
No Drawing. Filed Apr. 16, 1969, Ser. No. 816,780
Claims priority, application Netherlands, May 3, 1968,
6806265
Int. Cl. C08h 17/36
U.S. Cl. 260—414                                    5 Claims

ABSTRACT OF THE DISCLOSURE

Lead-, cadmium-, and divalent tin salts of carboxylic acids having more than 6 carbon atoms, are prepared by reacting lead oxide, cadmium oxide or stannous oxide with carboxylic acid anhydrides at elevated temperatures that are above the melting point of the carboxylic acid anhydride.

FIELD OF INVENTION

The invention relates to a process for the preparation of lead-, cadmium- and stannous salts of carboxylic acids of more than 6 carbon atoms.

DESCRIPTION OF PRIOR ART

The preparation of the acetates of barium, lead, calcium and mercury, has been suggested by reaction of the respective oxide with excess amounts of acetic acid anhydride (see Annales de Chimie 12 (5) 504–519). In the procedure disclosed in the French publication referred to, the metal oxide is heated with an excess of acetic acid anhydride for several hours. Upon completed reaction, the excess of acetic acid anhydride is washed out with ether. It is pointed out in the reference publication that— particularly in the case of heating calcium oxide with acetic acid anhydride for several hours in stoichiometric amounts—only partial conversion takes place, since the yield is below 50%. With respect to the preparation of lead and mercury acetate, larger excess amounts of acetic acid anhydride were used than in the preparation of the acetate of barium and calcium.

The publication referred to furthermore discloses that calcium butyrate and calcium capronate can be prepared by heating calcium oxide with large excess amounts of butyric acid anhydride or capronic acid anhydride respectively, the heating to be carried out for several hours. The excess quantities of the acid anhydrides are removed after completed reaction by washing with anhydrous ether or by vacuum distillation and washing with anhydrous ether. Since, as is known, higher molecular acid anhydrides have a tendency partially to decompose when heated to higher temperatures—the decomposition resulting in the formation of free fatty acids—the preparation of pure, waterfree, higher molecular metal soaps by the reaction of a metal oxide with an excess amount of higher molecular acid anhydrides is not feasible.

Metal soaps may, moreover, be produced according to the so-called "melting method" wherein carboxylic acids are heated with metal oxides, metal hydroxides or metal carbonates.

Finally, it is known that metal soaps may be obtained according to the so-called "precipitation process" resulting oftentimes in light weight, voluminous products. According to this prior art process, the fatty acids, in aqueous media, are first converted into the respective alkali metal—or ammonium soaps from which the substantially water insoluble metal soaps are obtained by the addition of alkaline earth metal—or heavy metal salt solutions. The precipitated metal soaps have to be liberated from contaminants by careful washing for prolonged period of time. In both these prior art processes for the production of metal soaps, the removal of water has to be carefully observed, which requires considerable expenditure.

SUMMARY OF THE INVENTION

Surprisingly, it has been ascertained that the lead-, cadmium- and stannous salts of carboxylic acids having more than 6 carbon atoms, may be prepared in an exceedingly simple manner, by reacting lead oxide, cadmium oxide or stannous oxide with carboxylic acid anhydride of one or several carboxylic acids having more than 6 carbon atoms, at temperatures which are above the melting point of the respective carboxylic acid anhydride or anhydride mixture. It is particularly surprising in this reaction that the slightly basic metal oxides, to wit, lead oxide, cadmium oxide and stannous oxide—if compared to the strongly basic alkaline earth metal oxides—are capable of reacting at all with higher carboxylic acid anhydrides. Even more surprising is that the reaction proceeds so smoothly and without any special inducement.

According to a preferred embodiment of the invention, the reaction is carried out with stoichiometric amounts of the reaction components, to wit, the metal oxide and the carboxylic acid anhydrides. Provided the required reaction temperatures and reaction times are properly adhered to, the reaction, calculated on the stoichiometric amounts of the respective oxide and the caboxylic acid anhydride or anhydrides, proceeds essentially in quantitative manner. Further, the formed metal soaps are obtained in liquid form at the respective reaction temperatures. For these reasons the use of solvents is not absolutely required although, of course, the reaction may be carried out in a solvent medium.

Dependent on the paritcular metal soap to be produced, the reaction temperature should advantageously be in the range of between about 80° to 250° C. If the bivalent metal oxides used in the present reaction are contaminated by oxide moieties of higher valency, then these higher valency oxide portions do not take part in the reaction with the higher molecular carboxylic acid anhydrides. If the respective lead oxide, cadmium oxide or stannous oxide is supplied to the reaction in contaminated form the contaminant either being an oxide of different valency or another substance, separation of the contaminant from the reaction product may be readily effected since the contaminant remains as a solid residue. Such separation can be effected by the addition of a suitable solvent as, for example, benzene, toluene, xylene, trichloroethylene, perchloroethylene or the like. The metal soap is then dissolved in the solvent but the residue remains in the reaction vessel.

The inventive reaction may be carried out with anhydrides of a wide variety of carboxylic acids of more than 6 carbon atoms. Examples of anhydrides of acids with which the reaction is particularly advantageously carried out are those of the aliphatic saturated and unsaturated carboxylic acids, such as the fatty acids. Further aromatic carboxylic acids such as benzoic acid and mixed aromatic-aliphatic carboxylic acids are suitable. As a matter of fact, applicants are not aware of any anhydride of a carboxylic acid having more than 6 carbon atoms with which the inventive reaction could not be carried out.

A particular advantage of the inventive procedure is that the reaction proceeds so smoothly and without requiring any substantial energy expenditure and that, considering the available space or volume of the reaction vessel, a maximum yield of metal soap is obtained.

Since the reaction, as pointed out, may be carried out without solvent and without excess amounts of the reaction components, the reaction essentially being an addition of the two reaction components to form the metal soap without the formation of any byproduct, pure reaction products are obtained without that the space of the reaction vessel is occupied by any extraneous matter. Further, the reaction product needs no subsequent purification. This, of course, only applies to those instances in which the reactants are used in pure form.

A further advantage of the inventive procedure is that the metal soaps, which are in liquid form at room temperature, can, from the very outset, be imparted with desirable physical characteristics and conditions by suitably choosing the reaction conditions with a view to the subsequent use of the metal soap. Since the reactions are partly strongly exothermic it is oftentimes advantageous to interrupt the supply of energy to the reaction once the reaction has been initiated or to cool the reaction mixture.

The metal soaps which are produced in accordance with the inventive process have manifold utilities. They can be used as separating agents, as agents for imparting hydrophobic qualities, as thickeners, catalysts and for many other purposes.

The invention will now be described by several examples, it being understood, however, that these examples are given by way of illustration and not by way of limitation, and that many changes may be effected without affecting in any way the scope and spirit of the invention as recited in the appended claims.

Example 1

111.6 g. of lead oxide (litharge) and 135.2 g. of 2-ethylhexanoic acid anhydride were heated in a 500 ml. three-neck flask of glass to a temperature of 80° C. The mixture was agitated during the heating. Once the 80° C. temperature had been reached, the inner temperature of the product rose strongly without further extraneous heating, due to the occurrence of an exothermic reaction between the reaction components. The reaction proceeded for about 15 minutes and was thereafter complete. The reaction product is a yellow-brown colored lead octoate. The yield was 246.8 g.

Example 2

22.3 g. of lead oxide and 55.2 g. of stearic acid anhydride, containing 70% of stearic acid anhydride and 30% of palmitic acid anhydride, were heated in a 250 ml. three-neck flask of glass under stirring for about 30 minutes and to a temperature of about 200° C. After termination of the reaction 77.5 g. of lead stearate were obtained.

Example 3

22.3 g. of litharge and 54.7 g. of oleic acid anhydride were added to a 250 ml. three-neck flask of glass. Contact of the two reactants resulted in heat evolution. The reaction mixture was then heated for about two hours to about 90° resulting in the formation of 77 g. of lead oleate.

Example 4

6.42 g. of cadmium oxide and 19.1 g. of lauric acid anhydride were heated in a 250 ml. three-neck flask of glass under stirring for about 15 minutes and to about 200 to 230° C. The reaction resulted in the formation of 25.52 g. of cadmium laurate.

Example 5

76.3 g. of technical grade stannous oxide having an SnO content of 88.1%, and 135.2 g. of 2-ethylhexanoic acid anhydride were heated in a 500 ml. three-neck flask of glass under stirring and in a nitrogen atmosphere. The heating was effected for about 12 hours and to a temperature of about 100° C. Upon termination of the reaction, the unreacted residue which remains in the reaction system can be recognized by the color change from black to light grey. In order to separate the solid residue from the reaction product, the reaction product, upon finished reaction, was dissolved in a suitable solvent as for example toluene, of which 250 ml. were added to the flask. This resulted in dissolution of the reaction product and the solution was separated from the solid residue in any suitable manner. After removal of the solvent by distillation under vacuum conditions, 200 g. of tin octoate were obtained.

Example 6

76.3 g. of technical grade stannous oxide, having an SnO content of 88.1%, and 135.2 g. of 2-ethylhexanoic acid anhydride were heated in a 500 ml. three-neck flask of glass in a nitrogen atmosphere. The heating was conducted under stirring and up to a temperature of about 130° C. After this product temperautre had been obtained, the exothermic reaction which sets in caused a temperature increase to about 165° C. The reaction mixture was subsequently heated for about 90 minutes to about 130° C. Upon completion of the reaction, the color change of the remaining residue from black to light grey indicates the presence of the solid unreacted residue.

The tin octoate obtained was separated from the solid residue by the addition of a suitable solvent as, for example, toluene. This resulted in the formation of a solution which was separated from the residue by filtration. The solvent was then removed by distillation under vacuum conditions, resulting in the recovery of 198.5 g. of tin octoate.

Example 7

44.6 g. of litharge and 45.2 g. of benzoic acid anhydride were heated in a 250 ml. three-neck flask of glass. The heating was effected under stirring for about 4 hours and to a temperature of about 200 to 220° C. 89.8 g. of lead benzoate were obtained in this manner.

What is claimed is:

1. A process of preparing the lead-, cadmium- and bivalent tin salts of carboxylic acids having more than 6 carbon atoms, which comprises reacting lead oxide, cadmium oxide or stannous oxide with a carboxylic acid anhydride of at least one carboxylic acid having more than 6 carbon atoms and in the absence of carboxylic acid anhydride of a carboxylic acid having less than 6 carbon atoms, said reaction being carried out at an elevated temperature which is above the melting point of the respective carboxylic acid anhydride.

2. A process as claimed in claim 1, wherein said metal oxide and said carboxylic acid anhydrides are employed in substantially stoichiometric quantities.

3. A process as claimed in claim 1, wherein the reaction temperature is about between 80 to 250° C., dependent on the melting point of the respective anhydride.

4. A process as claimed in claim 1, wherein the reaction is conducted in the absence of a solvent.

5. A process as claimed in claim 1, wherein said carboxylic acid anhydride is the anhydride of an aliphatic saturated carboxylic acid, an aliphatic unsaturated carboxylic acid, an aromatic carboxylic acid or a mixed aromatic-aliphatic carboxylic acid.

References Cited

UNITED STATES PATENTS

| 2,838,554 | 6/1958 | Gloskey | 260—429.7 |
| 3,211,768 | 10/1965 | Considine | 260—414 |
| 3,271,310 | 9/1966 | Suer | 252—35 |

FOREIGN PATENTS

| 942,542 | 11/1963 | Great Britain | 260—414 |

LEWIS GOTTS, Primary Examiner

E. G. LOVE, Assistant Examiner

U.S. Cl. X.R.

106—1, 243, 310; 252—194, 383, 431; 260—429, 429.7, 435